United States Patent
Leggette et al.

(10) Patent No.: US 10,133,632 B2
(45) Date of Patent: Nov. 20, 2018

(54) DETERMINING COMPLETION OF MIGRATION IN A DISPERSED STORAGE NETWORK

(71) Applicant: International Business Machines Corporation, Armonk, NY (US)

(72) Inventors: Wesley B. Leggette, Chicago, IL (US); Manish Motwani, Chicago, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 15/485,160

(22) Filed: Apr. 11, 2017

(65) Prior Publication Data

US 2017/0220418 A1 Aug. 3, 2017

Related U.S. Application Data

(63) Continuation-in-part of application No. 15/056,517, filed on Feb. 29, 2016, now Pat. No. 9,727,266, which
(Continued)

(51) Int. Cl.
*G06F 15/167* (2006.01)
*G06F 11/10* (2006.01)
(Continued)

(52) U.S. Cl.
CPC ........ *G06F 11/1076* (2013.01); *G06F 3/0604* (2013.01); *G06F 3/067* (2013.01); *G06F 3/0647* (2013.01); *H04L 67/1097* (2013.01)

(58) Field of Classification Search
CPC .. G06F 11/1076; G06F 3/0647; G06F 3/0604; G06F 3/067; H04L 67/1097
(Continued)

(56) References Cited

U.S. PATENT DOCUMENTS 4,092,732 A 5/1978 Ouchi
5,060,266 A 10/1991 Dent
(Continued)

OTHER PUBLICATIONS

Chung; An Automatic Data Segmentation Method for 3D Measured Data Points; National Taiwan University; pp. 1-8; 1998.
(Continued)

*Primary Examiner* — Chris Parry
*Assistant Examiner* — Weiwei Stiltner
(74) *Attorney, Agent, or Firm* — Garlick & Markison; Timothy W. Markison; Tim D. Taylor

(57) ABSTRACT

A method for determining completion of a data migration that results from a distributed agreement protocol (DAP) change within a distributed storage network (DSN). The method begins by transferring, in accordance with the DAP change, encoded data slices to one or more other storage units within the DSN. The method continues by maintaining a storage unit migration tracking repository that tracks migration of the encoded data slices. The method continues by maintaining a storage pool migration tracking repository based on the storage unit migration tracking repositories of the plurality of storage units. The method continues by maintaining a DSN migration tracking repository based on the storage pool migration tracking repositories of the plurality of storage pools. The method continues by indicating completion of the data migration as a result of the DAP change based on information within the DSN tracking repository.

18 Claims, 8 Drawing Sheets

Related U.S. Application Data is a continuation-in-part of application No. 12/903,212, filed on Oct. 13, 2010, now Pat. No. 9,462,316.

(60) Provisional application No. 61/290,632, filed on Dec. 29, 2009, provisional application No. 62/154,867, filed on Apr. 30, 2015.

(51) Int. Cl.
  *H04L 29/08* (2006.01)
  *G06F 3/06* (2006.01)
(58) Field of Classification Search
  USPC ............................................................ 709/213
  See application file for complete search history.

(56) References Cited

U.S. PATENT DOCUMENTS

| | | | |
|---|---|---|---|
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,433,978 B2 | 4/2013 | Grube et al. | |
| 9,276,900 B1 * | 3/2016 | Daud | H04L 61/2069 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0154408 A1 | 6/2008 | Morohashi | |
| 2008/0183975 A1 | 7/2008 | Foster et al. | |
| 2009/0083809 A1 | 3/2009 | Hayashi et al. | |
| 2009/0094251 A1 | 4/2009 | Gladwin et al. | |
| 2009/0094318 A1 | 4/2009 | Gladwin et al. | |
| 2009/0157740 A1 | 6/2009 | Barley et al. | |
| 2010/0023524 A1 | 1/2010 | Gladwin et al. | |
| 2010/0235528 A1 | 9/2010 | Bocharov et al. | |
| 2011/0040981 A1 | 2/2011 | Lindahl et al. | |
| 2014/0331100 A1 * | 11/2014 | Dhuse | G06F 21/64 714/752 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.

* cited by examiner

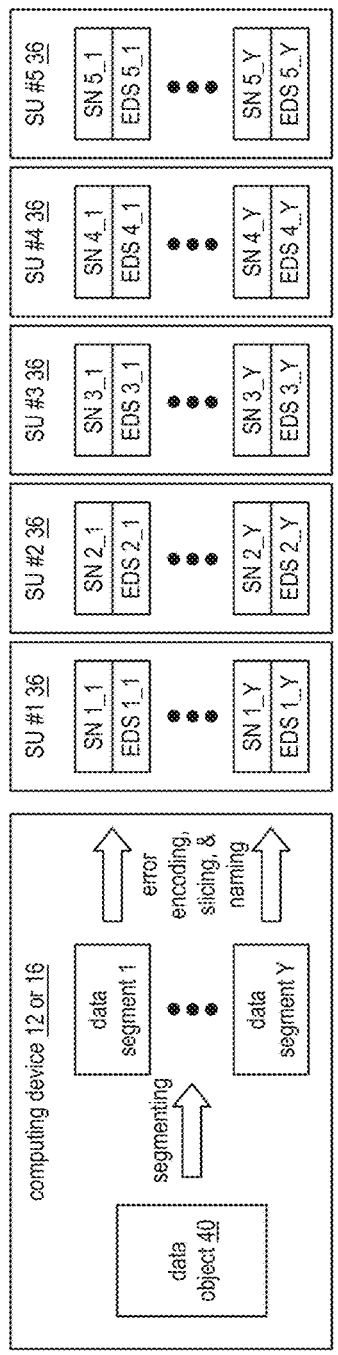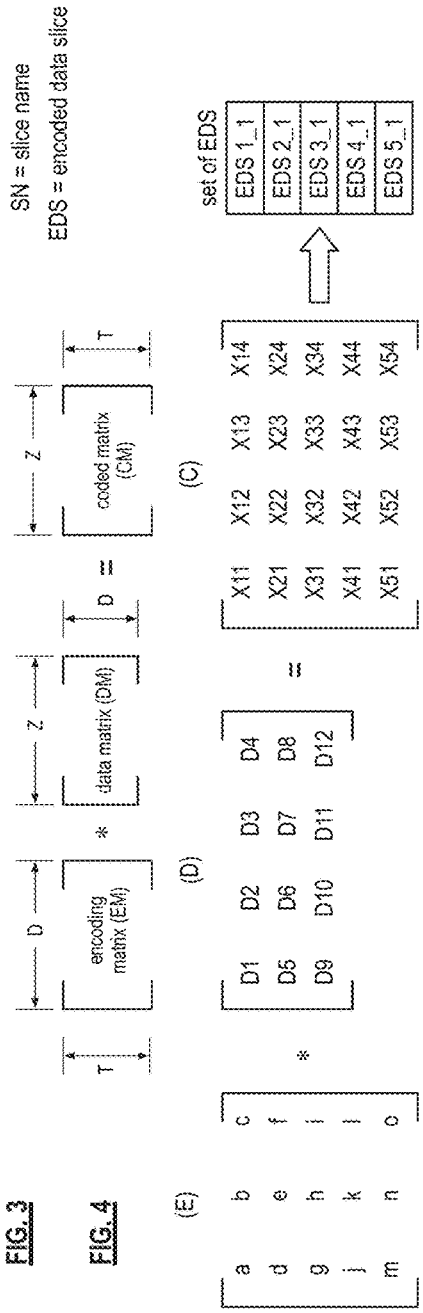

FIG. 11

DETERMINING COMPLETION OF MIGRATION IN A DISPERSED STORAGE NETWORK

CROSS REFERENCE TO RELATED PATENTS

The present U.S. Utility Patent Application claims priority pursuant to 35 U.S.C. § 120 as a continuation-in-part of U.S. Utility application Ser. No. 15/056,517, entitled "SELECTING STORAGE UNITS IN A DISPERSED STORAGE NETWORK," filed Feb. 29, 2016, which is a continuation-in-part of U.S. Utility application Ser. No. 12/903,212, entitled "DIGITAL CONTENT RETRIEVAL UTILIZING DISPERSED STORAGE," filed Oct. 13, 2010, now U.S. Pat. No. 9,462,316, which claims priority pursuant to 35 U.S.C. § 119(e) to U.S. Provisional Application No. 61/290,632, entitled "DIGITAL CONTENT DISTRIBUTED STORAGE," filed Dec. 29, 2009, all of which are hereby incorporated herein by reference in their entirety and made part of the present U.S. Utility Patent Application for all purposes.

U.S. Utility application Ser. No. 15/056,517 also claims priority pursuant to 35 U.S.C. § 119(e) to U.S. Provisional Application No. 62/154,867, entitled "AUTHORIZING A SLICE ACCESS REQUEST IN A DISPERSED STORAGE NETWORK," filed Apr. 30, 2015, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

As is further known, data storage systems may change over time. For example, storage devices may fail, new storage devices may be added, etc. When the storage system changes, it may be preferable to change storage locations for some of the data. For example, when a new storage device is added to a data storage system, it may be preferable to move storage of some data in an old storage device to the new storage device.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 11 is a schematic block diagram of an embodiment of a plurality of tracking repositories in accordance with the present invention.

DETAILED DESCRIPTION OF THE INVENTION

Figure 1:
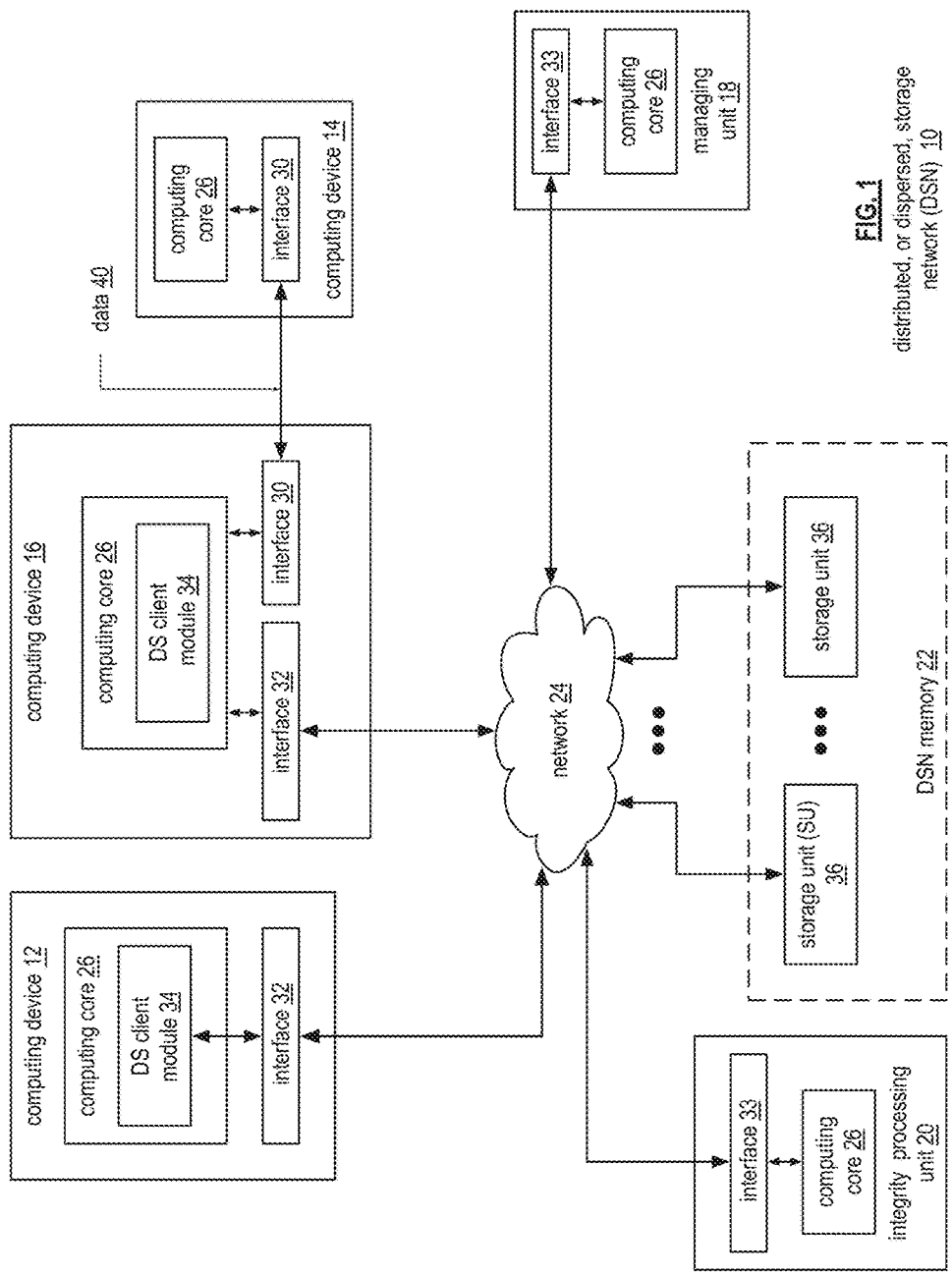
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
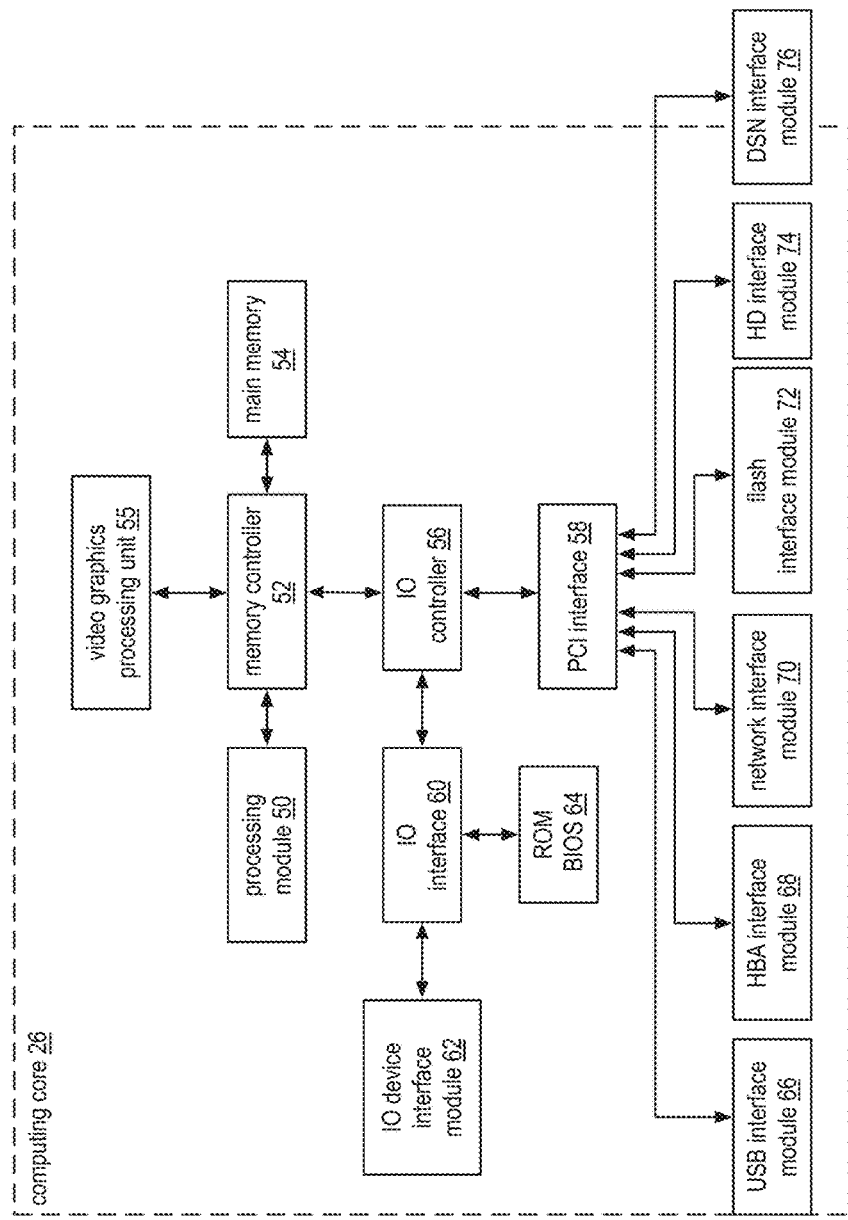
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41_X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 78 is shown in FIG. 6. As shown, the slice name (SN) 78 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
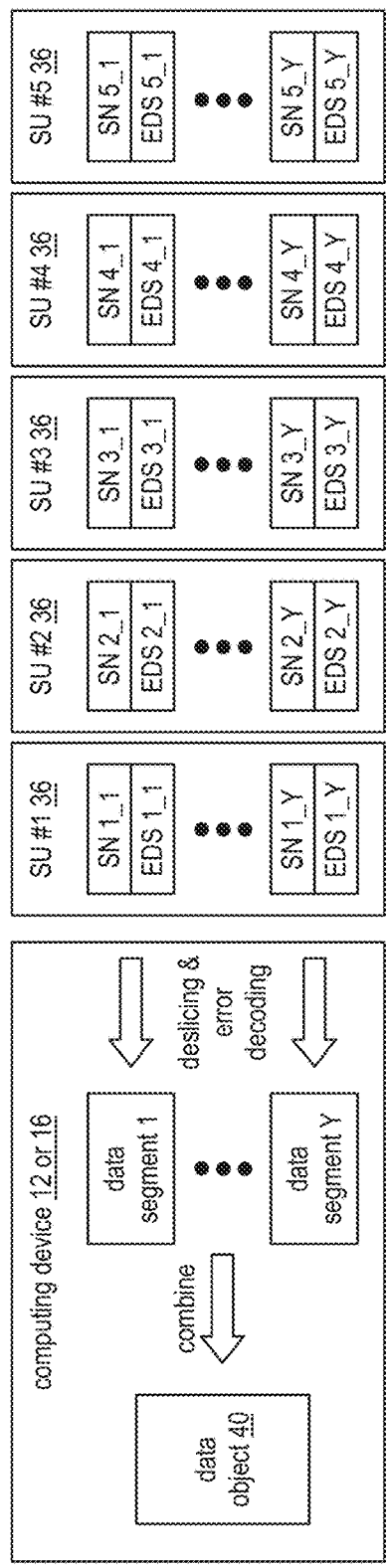
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
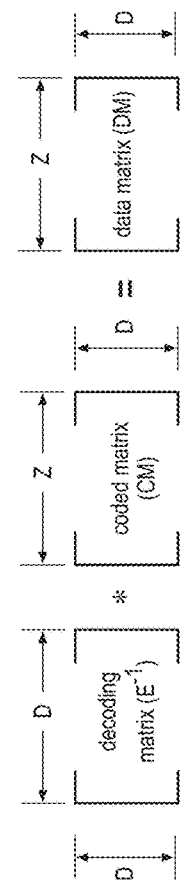
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
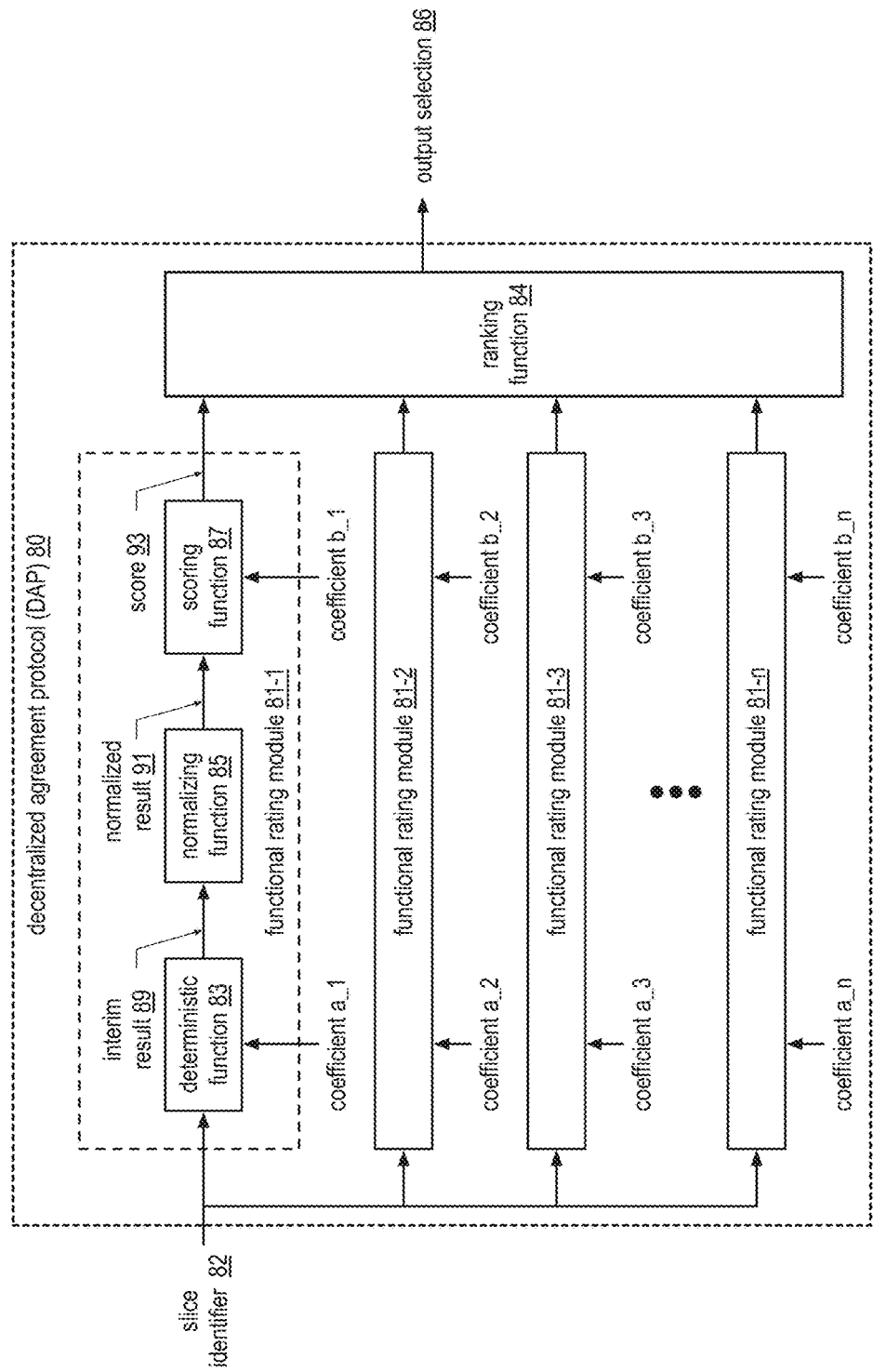
FIG. 9 is a schematic block diagram of an embodiment of a decentralized, or distributed, agreement protocol (DAP) in accordance with the present invention.

FIG. 9 is a schematic block diagram of an embodiment of a decentralized, or distributed, agreement protocol (DAP) 80 that may be implemented by a computing device, a storage unit, and/or any other device or unit of the DSN to determine where to store encoded data slices or where to find stored encoded data slices. The DAP 80 includes a plurality of functional rating modules 81. Each of the functional rating modules 81 includes a deterministic function 83, a normalizing function 85, and a scoring function 87.

Each functional rating module 81 receives, as inputs, a slice identifier 82 and storage pool (SP) coefficients (e.g., a first functional rating module 81-1 receives SP 1 coefficients "a" and b). Based on the inputs, where the SP coefficients are different for each functional rating module 81, each functional rating module 81 generates a unique score 93 (e.g., an alpha-numerical value, a numerical value, etc.). The ranking function 84 receives the unique scores 93 and orders them based on an ordering function (e.g., highest to lowest, lowest to highest, alphabetical, etc.) and then selects one as a selected storage pool 86. Note that a storage pool includes one or more sets of storage units. Further note that the slice identifier 82 corresponds to a slice name or common attributes of set of slices names. For example, for a set of encoded data slices, the slice identifier 82 specifies a data segment number, a vault ID, and a data object ID, but leaves open ended, the pillar number. As another example, the slice identifier 82 specifies a range of slice names (e.g., 0000 0000 to FFFF FFFF).

As a specific example, the first functional rating module 81-1 receives the slice identifier 82 and SP coefficients for storage pool 1 of the DSN. The SP coefficients includes a first coefficient (e.g., "a") and a second coefficient (e.g., "b"). For example, the first coefficient is a unique identifier for the corresponding storage pool (e.g., SP #1's ID for SP 1 coefficient "a") and the second coefficient is a weighting factor for the storage pool. The weighting factors are derived to ensure, over time, data is stored in the storage pools in a fair and distributed manner based on the capabilities of the storage units within the storage pools.

For example, the weighting factor includes an arbitrary bias which adjusts a proportion of selections to an associated location such that a probability that a source name will be mapped to that location is equal to the location weight divided by a sum of all location weights for all locations of comparison (e.g., locations correspond to storage units). As a specific example, each storage pool is associated with a location weight factor based on storage capacity such that, storage pools with more storage capacity have a higher location weighting factor than storage pools with less storage capacity.

The deterministic function 83, which may be a hashing function, a hash-based message authentication code function, a mask generating function, a cyclic redundancy code function, hashing module of a number of locations, consistent hashing, rendezvous hashing, and/or a sponge function, performs a deterministic function on a combination and/or concatenation (e.g., add, append, interleave) of the slice identifier 82 and the first SP coefficient (e.g., SU 1 coefficient "a") to produce an interim result 89.

The normalizing function 85 normalizes the interim result 89 to produce a normalized interim result 91. For instance, the normalizing function 85 divides the interim result 89 by a number of possible output permutations of the deterministic function 83 to produce the normalized interim result. For example, if the interim result is 4,325 (decimal) and the number of possible output permutations is 10,000, then the normalized result is 0.4325.

The scoring function 87 performs a mathematical function on the normalized result 91 to produce the score 93. The mathematical function may be division, multiplication, addition, subtraction, a combination thereof, and/or any mathematical operation. For example, the scoring function divides the second SP coefficient (e.g., SP 1 coefficient "b") by the negative log of the normalized result (e.g., ey=x and/or ln(x)=y). For example, if the second SP coefficient is 17.5 and the negative log of the normalized result is 1.5411 (e.g., e(0.4235)), the score is 11.3555.

The ranking function 84 receives the scores 93 from each of the function rating modules 81 and orders them to produce a ranking of the storage pools. For example, if the ordering is highest to lowest and there are five storage pools in the DSN, the ranking function evaluates the scores for five storage pools to place them in a ranked order. From the ranking, the ranking module 84 selects one the storage pools 86, which is the target for a set of encoded data slices.

The DAP 80 may further be used to identify a set of storage units, an individual storage unit, and/or a memory device within the storage unit. To achieve different output results, the coefficients are changed according to the desired location information. The DAP 80 may also output the ranked ordering of the scores.

Figure 10:
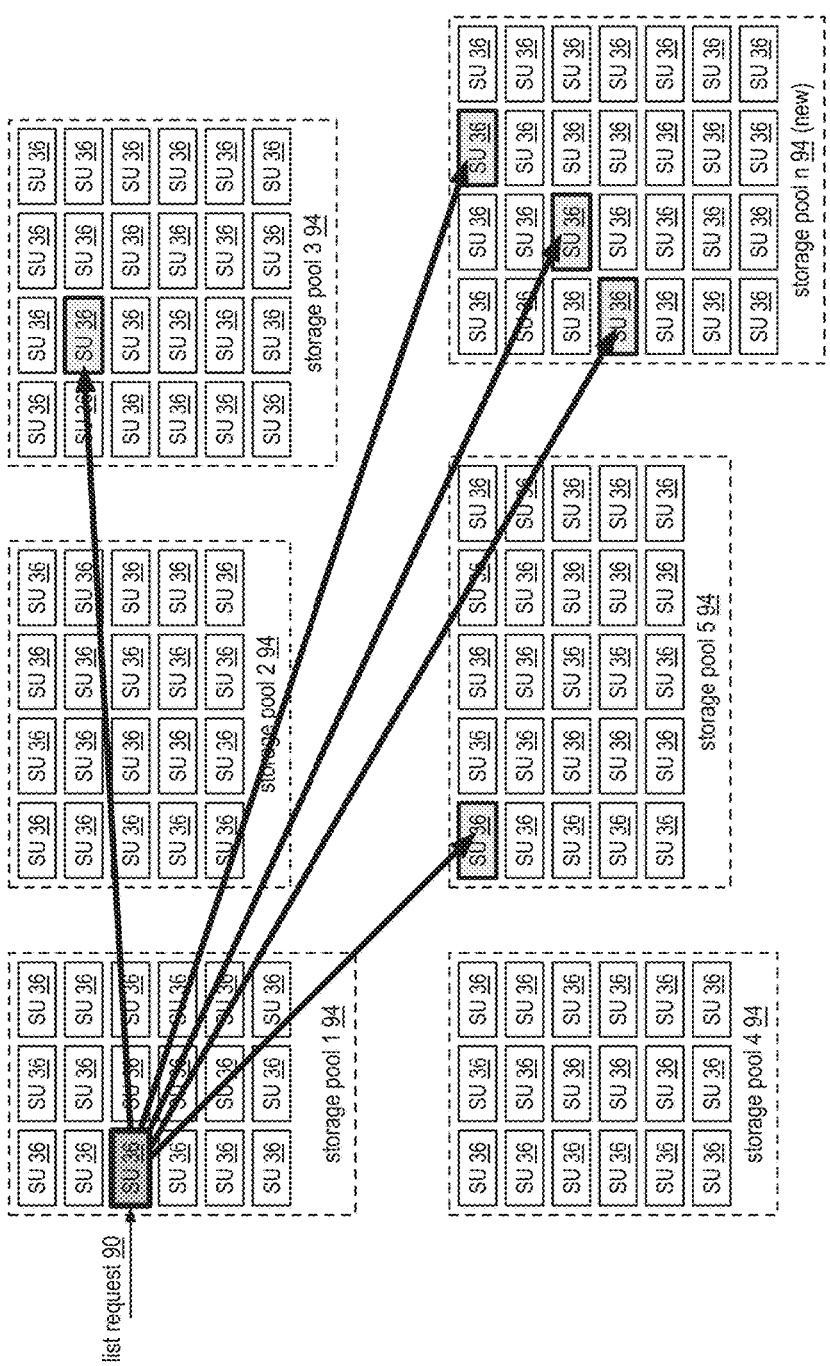
FIG. 10 is a schematic block diagram of an embodiment of a plurality of storage pools in accordance with the present invention.

FIG. 10 is a schematic block diagram of a plurality of storage pools of a dispersed storage network (DSN). Each storage pool 94 includes a plurality of storage units 36. For example, storage pool 1 includes 18 storage units, storage pool 2 includes 20 storage units, and so on. Note that, while six storage pools are shown, the DSN may include more or less storage pools and that each storage pool may include more or less storage units than shown.

In an example of operation, a distributed agreement protocol (DAP) change occurs as a result of adding a new storage pool (e.g., storage pool 6 94). Due to the DAP change, some data being stored in one or more storage units (e.g., according to an old DAP) will now be mapped to one or more other storage units (e.g., according to the new DAP). In order for the DAP change to be completed, all data that is mapped to different storage units needs to be transferred (e.g., before sending listing requests according to the new DAP). Note that during the migration, the DSN will use either the old DAP or the new DAP for data access requests.

In one example of operation, during a DAP change, access requests (e.g., write requests, read requests, listing requests 90, etc.) are sent to the storage units according to an old DAP. During the migration (e.g., transferring the data according to the DAP change), storage units proxy access requests for data that is stored according to a different DAP and, due to the size of some storage systems (e.g., 5-5,000 petabytes), it may take a significant amount of time to migrate the data. Thus, allowing the DSN to track progress of a migration and determine when the migration has completed is important so that the storage units know when they no longer need to proxy requests.

As an example of tracking the migration, a computing device (e.g., integrity processing unit 20 of FIG. 1, managing unit 18 of FIG. 1, computing device 12-16 of FIG. 1) utilizes a rebuild list requests 90 to identify encoded data slices that are involved in the data migration. For example, the rebuild list request is a request to list all of the encoded data slices a storage unit is storing (e.g., under the old DAP)

within a given DSN address range. A storage unit 36 analyzes slice names of the encoded data slices it is storing in light of the DSN address range to identify encoded data slices that are in the DSN address range. The storage unit then evaluates the slice names according to the DAP change to determine whether any of the identified encoded data slices are part of the data migration (e.g., mapped to a different storage unit as a result of the DAP change). When the storage unit determines that one or more encoded data slices are now mapped to a different storage unit, the source names associated with the encoded data slices are entered into a storage unit migration tracking repository.

As a specific example, during a DAP change, a storage unit 36 in storage pool 1 94 receives a list request 90 from the computing device. In response to the list request 90, the storage unit determines whether it is storing any encoded data slices that are to be transferred to another storage unit according to the DAP change. In this example, the storage unit 36 (e.g., the dark shaded storage unit (SU)) determines that five encoded data slices will be transferred according to the DAP change. Each weighted arrow from the dark shaded storage unit 36 to the lighter shaded storage units 36 represent an encoded data slice that has been or will be transferred according to the DAP change. For example, the storage unit 36 determines a first encoded data slice will be transferred to a storage unit in storage pool 3 94, a second, third and fourth encoded data slice will be transferred to a different one of three storage units 36 in the new storage pool 6 94, and a fifth encoded data slice will be transferred to a storage unit 36 in storage pool 5 94. Next, the storage unit 36 enters the source names associated with the five encoded data slices to be transferred into a storage unit migration tracking repository associated with the storage unit 36.

The storage unit migration tracking repositories will be discussed further in reference to FIGS. 11 and 12. Note the list requests occur such that the DSN address range for the rebuild list requests is cycled through multiple times before the data migration as a result of the DAP change is completed (e.g., the rebuild list cycle time is a fraction of the data migration time). Further note most DSNs will use the previous DAP for data access requests until migration is complete, however, for some DSNs it may be more advantageous to use the new DAP (e.g., when the size of new storage being added to the DSN is much greater than the size of previous storage in the DSN).

Figure 11:
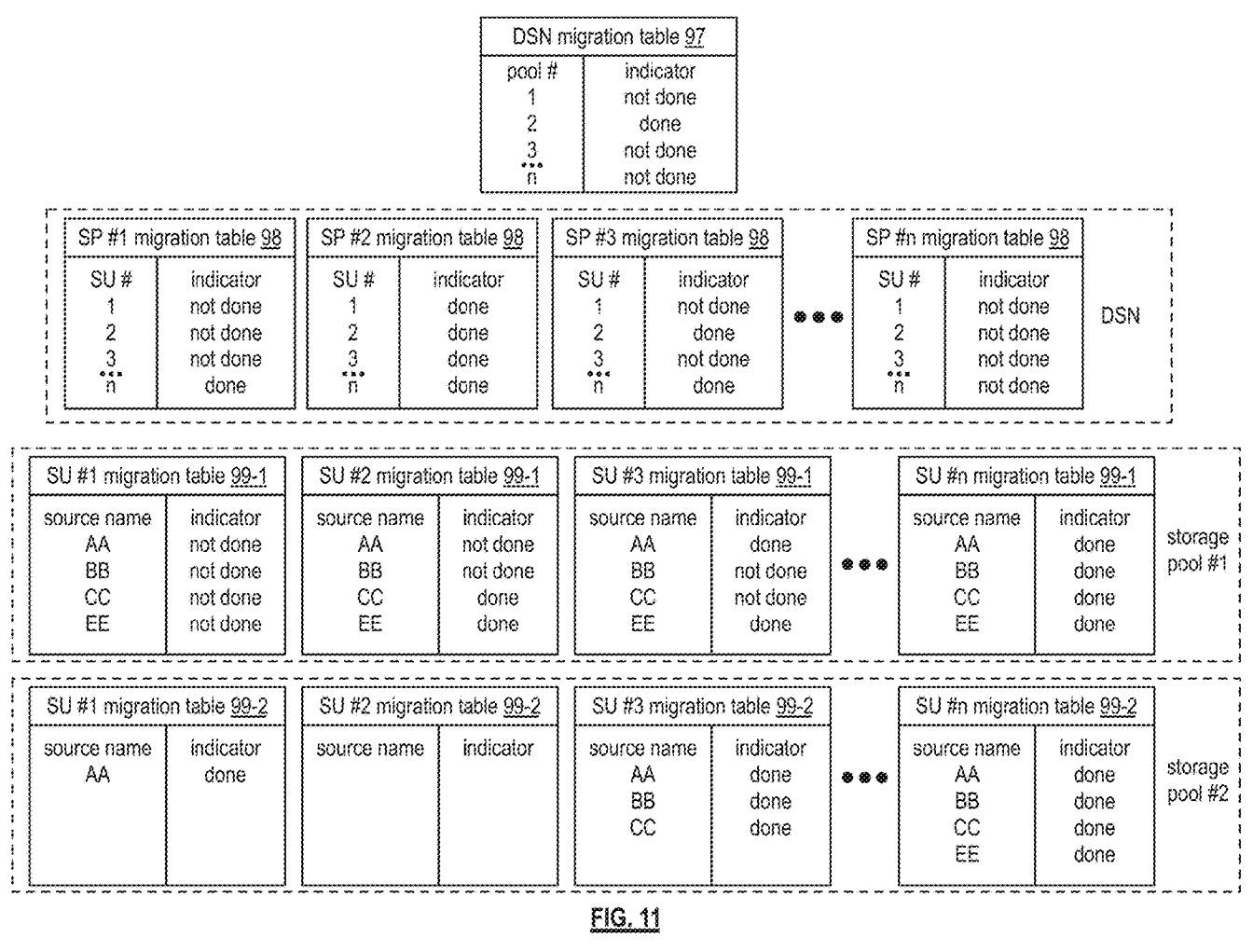

FIG. 11 is a schematic block diagram of tracking repositories for the DSN. These tracking repositories track the progress of a data migration in response to a DAP change. Since migrations may take some time (e.g., a few minutes, a few hours, a few days, etc.) to complete and may involve migration of thousands of encoded data slices, tracking the progress and completion of the data migration enables the DSN to know when to begin using a new DAP for access requests and indicates when storage units can stop proxying access requests being sent according the old DAP.

The tracking repositories include DSN migration table 97, a plurality of storage pool migration tables 98, and pluralities of storage unit migration tables 99. Note that although storage unit migration tables are only shown for storage pools #1 and #2, there are storage unit migration tables for up to n number of storage pools. The DSN migration tracking repository 97 includes a pool # field and an indicator field. The pool # field includes the storage pools (e.g., storage pools 1-*n*) within the DSN. The indicator field contains a status (e.g., done, not done, complete, non-complete, etc.) for each pool within the DSN.

The storage pool migration tables 98 include a storage unit number field and an indicator field. The storage unit number field includes the number of storage units within the storage pool (e.g., SU #1-*n*) and the indicator field includes a status for each of the storage units (e.g., done, not done, complete, non-complete, etc.).

The storage unit migration tables 99 include a source name field and an indicator field. The source name field contains source names related to encoded data slices being transferred from the storage unit to another storage unit in the DSN. For example, SU #1 migration table 99-2 includes source name AA. As another example, SU #2 99-2 includes no source names, which indicates that any encoded data slices that were to be transferred, have been transferred or indicates that no encoded data slices were to be transferred due to the DAP change.

As an example for a given point in time of a data migration due to a DAP change, a storage unit #1 of storage pool #2 receives a listing request 90 during a DAP change and determines that one or more encoded data slices are to be transferred to another storage unit 36. Storage unit #1 determines the source name associated with each encoded data slice being transferred. In this example, the encoded data slices being transferred have a common source name of AA. The identified source name(s) are added to the storage unit migration tracking repository 99-1. Note that by recording the source names instead of the individual slice names, much less data is recorded in the migration tables.

The listing request 90 that storage unit #1 is receiving is one of many listing requests it receives during the DAP change. For instance, for a previous listing request, storage unit #1 identified encoded data slices to be transferred and determined sources names of AA, BB, and CC for them. During the time between receiving the previous listing request and receiving the current listing request, the storage unit has transferred all of the encoded data slices having source names of BB and CC. As such, when storage unit #1 updates its migration table, it removes source names BB and CC, leaving only source name AA.

At some later point in time, storage unit #1 will receive another listing request. For this listing request, storage unit #1 will determine that it has transferred all of the encoded data slices for the DAP change. As such, it will update its migration table to have no slice names listed.

Returning to the example for a given point in time of a data migration, storage unit #2 of storage pool #2 has transferred all of its encoded data slices that needed to be migrated (if any). As such, its migration table includes no source names. Storage unit #3 of storage pool #2 has not yet completed transferring its encoded data slices and includes source names AA, BB, and CC in its migration table. Storage unit #n of storage pool #2 has not yet completed transferring its encoded data slices and includes source names AA, BB, CC, and EE in its migration table 99-2.

A storage pool monitoring module (e.g., a module in one or more storage units, a module in the manager unit, etc.) of storage pool #2 migration table 98 records content of the migration tables of the storage units in storage pool #2. At the given point in time, storage unit #2 has completed its data migration for the current DAP change and storage units 1 and 3-*n* have not. Accordingly, the storage pool monitoring module indicates in its migration table that storage unit #2 is done, while the other storage units are not.

The indication may be done in a variety of ways. For example, the migration table includes a storage unit field and an indicator field. Each storage unit of the storage pool has its own entry in the table: it is identity is recorded in the storage unit field and the status of its data migration is recorded in the indicator field. As another example, the migration table includes only the identities of storage units that have not yet finished their data migrations. When the table is empty, all of the storage units in the storage pool have completed their data migrations.

Continuing with the example for a given point in time of a data migration, each storage unit of storage pool #1 has completed their data migrations. As such, each storage unit migration table 99-1 is empty (or otherwise indicative of data migration completion). The storage pool monitoring module for storage pool #1 has updated storage pool #1 migration table to indicate that all of the storage units in storage pool #1 have completed their data migrations.

Further continuing with the example for a given point in time of a data migration, each storage unit of the other storage pools in the DSN maintain their respective storage unit migration tables and each storage pool monitoring module maintains their respective storage pool migration tables. As such, via a few layers of tables, a complete snapshot of data migration is taken with each issuance of a listing request.

A DSN monitoring module (e.g., a module in one or more storage units, a module in the manager unit, etc.) of the DSN maintains a DSN migration tracking repository (or table) 97 to reflect the status of data migration for the DAP change for the DSN. At the given point in time, the DSN migration table 97 indicates that the storage units of storage pool #1 have all completed their data migrations (if any) and that the remaining storage pools have at least one storage unit that has not yet completed its data migration. Note that the DSN monitoring module communicates with the storage pool monitoring modules to obtain the relevant information for maintaining the DSN migration table 97.

The indication may be done in a variety of ways. For example, the DSN migration table includes a storage pool field and an indicator field. Each storage pool of the DSN has its own entry in the table: it is identity is recorded in the storage pool field and the status of its data migration is recorded in the indicator field. As another example, the DSN migration table includes only the identities of storage units that have not yet finished their data migrations. When the table is empty, all of the storage pools in the DSN have completed their data migrations, which indicates that the data migration is complete for the DAP change.

Figure 12:
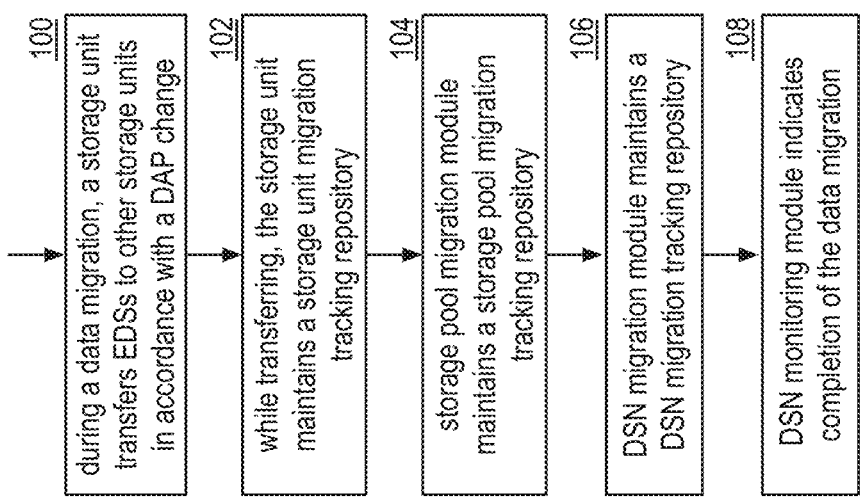
FIG. 12 is a logic diagram of an example of a method of determining completion of a migration in accordance with the present invention.

FIG. 12 is a logic flow diagram of determining completion of a data migration that results from a distributed agreement protocol (DAP) change within a DSN. As mentioned above, the DSN includes a plurality of storage pools and a storage pool includes a plurality of storage units. The method begins with step 100, where a storage unit transfers, in accordance with the DAP change, encoded data slices to one or more other storage units within the DSN.

While transferring the encoded data slices, the method continues to step 102, where the storage unit maintains a storage unit migration tracking repository that tracks migration of the encoded data slices. For example, the storage unit maintains the storage unit migration tracking repository (e.g., a storage unit migration table) by receiving a rebuild listing request that includes a range of DSN addresses. The storage unit then identifies encoded data slice(s) that have a DSN address(es) within the range of DSN addresses to produce identified encoded data slices. The storage unit then determines whether the identified encoded data slices have been transferred.

When one or more of the identified encoded data slices have not been transferred, the storage unit determines a source name(s) associated with the transferred encoded data slices and adds the source name(s) to the storage unit migration tracking repository. When the identified encoded data slices have been transferred, the storage unit determines whether corresponding source names are in its migration tracking repository. If so, the storage unit deletes them to indicate that all encoded data slices affiliated with a source name have been transferred.

The method continues with step 104, where a storage pool monitoring module affiliated with a storage pool maintains a storage pool migration tracking repository (e.g., a storage pool migration table) to track the progress of data migration of its storage units. This is done by accessing the storage unit migration tracking repositories of the storage units. An example was provided with reference to FIG. 11.

The method continues with step 106, where a DSN monitoring module affiliated with the DSN maintains a DSN migration tracking repository based on the storage pool migration tracking repositories of the storage pools. The DSN migration tracking repository tracks the progress of data migration at the storage pool level. An example was provided with reference to FIG. 11.

The method continues with step 108, where the DSN monitoring module indicates completion of the data migration as a result of the DAP change based on information within the DSN tracking repository. For example, the DSN monitoring module indicates completion of the data migration when each storage pool indicates completion of their respective data migrations.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for determining completion of a data migration that results from a distributed agreement protocol (DAP) change within a distributed storage network (DSN) that includes a plurality of storage pools, wherein a storage pool of the plurality of storage pools includes a plurality of storage units, the method comprises:
   in accordance with the DAP change, transferring, by a storage unit of the plurality of storage units, encoded data slices to one or more other storage units within the DSN;
   while transferring the encoded data slices, maintaining, by the storage unit, a storage unit migration tracking repository that tracks migration of the encoded data slices;
   maintaining, by a storage pool monitoring module affiliated with the storage pool, a storage pool migration tracking repository based on the storage unit migration tracking repositories of the plurality of storage units, wherein the storage pool migration tracking repository tracks migration of a group of encoded data slices by the plurality of storage units;
   maintaining, by a DSN monitoring module affiliated with the DSN, a DSN migration tracking repository based on the storage pool migration tracking repositories of the plurality of storage pools, wherein the DSN migration tracking repository tracks migration of a plurality of groups of encoded data slices by pluralities of storage units of the plurality of storage pools; and
   indicating, by the DSN monitoring module, completion of the data migration as a result of the DAP change based on information within the DSN tracking repository.

2. The method of claim 1, wherein the maintaining the storage unit migration tracking repository comprises:
   receiving a rebuild listing request that includes a range of DSN addresses;
   identifying one or more encoded data slices of the encoded data slices being transferred as a result of the DAP change that have one or more DSN addresses within the range of DSN addresses to produce identified encoded data slices;
   determining whether the identified encoded data slices have been transferred; and
   when one or more of the identified encoded data slices have not been transferred:
      determining one or more source names for the one or more encoded data slices; and
      adding the one or more source names to the storage unit migration tracking repository.

3. The method of claim 2 further comprises:
   when one or more of the identified encoded data slices have been transferred:
      determining whether the one or more source names are in the storage unit migration tracking repository;
      when the one or more source names are in the storage unit migration tracking repository; and
      deleting the one or more source names from the storage unit migration tracking repository.

4. The method of claim 1, wherein the maintaining by the storage pool migration tracking repository comprises:
   updating a first entry in the storage pool migration tracking repository for a first storage unit of the plurality of storage units based on a first status of migration by the first storage unit; and
   updating a second entry in the storage pool migration tracking repository for a second storage unit of the plurality of storage units based on a second status of migration by the second storage unit.

5. The method of claim 4 further comprises:
   determining the first status as non-complete when the storage unit migration tracking repository of the first storage unit includes at least one source name; and
   determining the first status as complete when the storage unit migration tracking repository of the first storage unit is void of source names.

6. The method of claim 4 further comprises:
   determining the first status as non-complete when the storage unit migration tracking repository of the first storage unit includes an indication that migration is incomplete for at least one source name; and
   determining the first status as complete when the storage unit migration tracking repository of the first storage unit includes an indication that migration is complete for all source names listed in the storage unit migration tracking repository of the first storage unit.

7. The method of claim 1, wherein the maintaining the DSN migration tracking repository comprises:
   updating a first entry in the DSN migration tracking repository for a first storage pool of the plurality of storage pools based on a first status of migration by the first storage pool; and
   updating a second entry in the DSN migration tracking repository for a second storage pool of the plurality of storage pools based on a second status of migration by the second storage pool.

8. The method of claim 7 further comprises:
   determining the first status as non-complete when the storage pool migration tracking repository of the first storage pool includes an indication that migration is incomplete for at least one storage unit of a first plurality of storage units associated with the first storage pool; and
   determining the first status as complete when the storage pool migration tracking repository of the first storage pool includes an indication that migration is complete for all storage units of the first plurality of storage units.

9. The method of claim 1, wherein the indicating completion of the data migration comprises:
   determining a status of each storage pool of the plurality of storage pools indicates completion of data migration for the respective storage pool.

10. A computer readable storage device for determining completion of a data migration that results from a distributed agreement protocol (DAP) change within a distributed storage network (DSN) that includes a plurality of storage pools, wherein a storage pool of the plurality of storage pools includes a plurality of storage units, the computer readable storage device comprises:
   a first memory section that stores operational instructions that, when executed by a storage unit of the plurality of storage units of the DSN, causes the storage unit to:
      transfer in accordance with the DAP change, encoded data slices to one or more other storage units within the DSN;

a second memory section that stores operational instructions that, when executed by the storage unit, causes the storage unit to:
while transferring the encoded data slices, maintain a storage unit migration tracking repository that tracks migration of the encoded data slices;
a third memory section that stores operational instructions that, when executed by a storage pool monitoring module affiliated with the storage pool, causes the storage pool monitoring module to:
maintain a storage pool migration tracking repository based on the storage unit migration tracking repositories of the plurality of storage units, wherein the storage pool migration tracking repository tracks migration of a group of encoded data slices by the plurality of storage units;
a fourth memory section that stores operational instructions that, when executed by a DSN monitoring module affiliated with the DSN, causes the DSN monitoring module to:
maintain a DSN migration tracking repository based on the storage pool migration tracking repositories of the plurality of storage pools, wherein the DSN migration tracking repository tracks migration of a plurality of groups of encoded data slices by pluralities of storage units of the plurality of storage pools; and
a fifth memory section that stores operational instructions that, when executed by the DSN monitoring module, causes the DSN monitoring module to:
indicate completion of the data migration as a result of the DAP change based on information within the DSN tracking repository.

11. The computer readable storage device of claim 10, wherein the second memory section stores further operational instructions that, when executed by the storage unit, causes the storage unit to maintaining the storage unit migration tracking repository by:
receiving a rebuild listing request that includes a range of DSN addresses;
identifying one or more encoded data slices of the encoded data slices being transferred as a result of the DAP change that have one or more DSN addresses within the range of DSN addresses to produce identified encoded data slices;
determining whether the identified encoded data slices have been transferred; and
when one or more of the identified encoded data slices have not been transferred:
determining one or more source names for the one or more encoded data slices; and
adding the one or more source names to the storage unit migration tracking repository.

12. The computer readable storage device of claim 11, wherein the second memory section stores further operational instructions that, when executed by the storage unit, causes the storage unit to:
determine whether the one or more source names are in the storage unit migration tracking repository;
when the one or more source names are in the storage unit migration tracking repository; and
delete the one or more source names from the storage unit migration tracking repository.

13. The computer readable storage device of claim 10, wherein the third memory section stores further operational instructions that, when executed by the storage pool monitoring module, causes the storage pool monitoring module to maintain the storage pool migration tracking repository by:
updating a first entry in the storage pool migration tracking repository for a first storage unit of the plurality of storage units based on a first status of migration by the first storage unit; and
updating a second entry in the storage pool migration tracking repository for a second storage unit of the plurality of storage units based on a second status of migration by the second storage unit.

14. The computer readable storage device of claim 13, wherein the third memory section stores further operational instructions that, when executed by the storage pool monitoring module, causes the storage pool monitoring module to:
determine the first status as non-complete when the storage unit migration tracking repository of the first storage unit includes at least one source name; and
determine the first status as complete when the storage unit migration tracking repository of the first storage unit is void of source names.

15. The computer readable storage device of claim 13, wherein the third memory section stores further operational instructions that, when executed by the storage pool monitoring module, causes the storage pool monitoring module to:
determine the first status as non-complete when the storage unit migration tracking repository of the first storage unit includes an indication that migration is incomplete for at least one source name; and
determine the first status as complete when the storage unit migration tracking repository of the first storage unit includes an indication that migration is complete for all source names listed in the storage unit migration tracking repository of the first storage unit.

16. The computer readable storage device of claim 10, wherein the fourth memory section stores further operational instructions that, when executed by the DSN monitoring module, causes the DSN monitoring module to maintain the DSN migration tracking repository by:
updating a first entry in the DSN migration tracking repository for a first storage pool of the plurality of storage pools based on a first status of migration by the first storage pool; and
updating a second entry in the DSN migration tracking repository for a second storage pool of the plurality of storage pools based on a second status of migration by the second storage pool.

17. The computer readable storage device of claim 16, wherein the fourth memory section stores further operational instructions that, when executed by the DSN monitoring module, causes the DSN monitoring module to:
determine the first status as non-complete when the storage pool migration tracking repository of the first storage pool includes an indication that migration is incomplete for at least one storage unit of a first plurality of storage units associated with the first storage pool; and
determine the first status as complete when the storage pool migration tracking repository of the first storage pool includes an indication that migration is complete for all storage units of the first plurality of storage units.

18. The computer readable storage device of claim 10, wherein the fifth memory section stores further operational instructions that, when executed by the DSN monitoring module, causes the DSN monitoring module to indicate completion of the data migration by:

determining a status of each storage pool of the plurality of storage pools indicates completion of data migration for the respective storage pool.

* * * * *